United States Patent [19]

Nysen et al.

[11] Patent Number: 4,734,698
[45] Date of Patent: Mar. 29, 1988

[54] PASSIVE INTERROGATOR LABEL SYSTEM HAVING OFFSET COMPENSATION AND TEMPERATURE COMPENSATION FOR A SURFACE ACOUSTIC WAVE TRANSPONDER

[75] Inventors: Paul A. Nysen, Sunnyvale; Michael R. McCoy, Los Altos, both of Calif.

[73] Assignee: X-Cyte, Inc., Mountain View, Calif.

[21] Appl. No.: 793,165

[22] Filed: Oct. 31, 1985

[51] Int. Cl.$^4$ .............................................. G01S 13/80
[52] U.S. Cl. ...................................... 342/44; 342/174
[58] Field of Search .................... 342/51, 44, 42, 174, 342/43

[56] References Cited

U.S. PATENT DOCUMENTS

| | | | |
|---|---|---|---|
| 3,273,146 | 9/1966 | Hurwitz | 342/44 |
| 3,513,470 | 7/1958 | Rabow | 342/174 |
| 3,706,094 | 12/1972 | Cole et al. | 342/44 |
| 3,981,011 | 9/1976 | Bell, III | 342/44 |
| 4,059,831 | 11/1977 | Epstein | 342/44 |
| 4,180,815 | 12/1979 | Hill | 342/43 |
| 4,263,595 | 4/1981 | Vogel | 342/44 |
| 4,620,191 | 10/1986 | Skeie | 342/51 |
| 4,623,890 | 11/1986 | Nysen | 342/44 |
| 4,625,207 | 11/1986 | Skeie | 342/51 |
| 4,625,208 | 11/1986 | Skeie et al. | 342/51 |

Primary Examiner—Thomas H. Tarcza
Assistant Examiner—Donald E. Hayes, Jr.
Attorney, Agent, or Firm—Karl F. Milde, Jr.

[57] ABSTRACT

A passive interrogator label system is disclosed which transmits a first signal to, and receives a second signal from a remote, encoding transponder. In the preferred embodiment, the transponder is a passive, surface acoustic wave device which receives the first signal, processes this signal and transmits, in reply, the second signal which includes a unique identification code. The passive interrogator label system incorporates a means and method for compensating for variations in signal delays within the transponder due to changes in ambient temperature as well as manufacturing tolerances of the transponder. The method includes the steps of measuring the difference in delay times between two successive delay taps in the transponder and using this difference as a standard for determining the differences in delay times between other successive taps in the same transponder.

9 Claims, 17 Drawing Figures

PASSIVE INTERROGATOR LABEL SYSTEM HAVING OFFSET COMPENSATION AND TEMPERATURE COMPENSATION FOR A SURFACE ACOUSTIC WAVE TRANSPONDER

CROSS-REFERENCE TO RELATED APPLICATIONS

The present application is related in subject matter to the following commonly-owned applications for patent:

Application Ser. No. 509,523, filed June 30, 1983, of Paul A. Nysen, Halvor Skeie and Donald Armstrong for "System for Interrogating a Passive Transponder Carrying Phase-Encoded Information";

Application Ser. No. 793,704, filed 10/31/85, of Anthony J. Rossetti and Paul A. Nysen for "Interrogator/Receiver System for Use With a Remote Transponder" now U.S. Pat. No. 4,703,327.

BACKGROUND OF THE INVENTION

The present invention relates to a system for transmitting first signals to, and receiving second signals from one or more remote transponders. More particularly, the invention relates to a radar system utilizing transponders which are capable of receiving an interrogating first signal, processing this signal and transmitting, in reply, a second signal that is derived from the first signal and contains encoded information.

Because the aforementioned encoded information normally includes an identification code which is unique to each transponder, and because the transponders of this type are relatively light weight and small and may be easily attached to other objects to be identified, the transponders are sometimes referred to as "labels". The entire system, including the interrogator/receiver apparatus and one or more passive transponders, is therefore often referred to as a "passive interrogator label system" or "PILS".

Passive interrogator label system of the type to which the present invention relates are disclosed in the following U.S. patents:

| U.S. Pat. No. | Patentee |
|---|---|
| 3,273,146 | Horwitz, Jr. |
| 3,706,094 | Cole et al. |
| 3,755,803 | Cole et al. |
| 3,981,011 | Bell |
| 4,058,217 | Vaughan et al. |
| 4,059,831 | Epstein |
| 4,263,595 | Vogel |

Such a system is also disclosed in the commonly-owned patent applications referred to above.

In general, a passive interrogator label system includes an "interrogator" for transmitting a first radio frequency signal; at least one passive transponder which receives this first signal, processes it and sends back a second radio frequency signal containing encoded information; and a receiver, normally located next to the interrogator, for receiving the second signal and decoding the transponder-encoded information.

In the aforementioned patent application Ser. No. 509,523, a passive interrogator label system is disclosed in which the interrogator transmits a first signal having a first frequency that successively assumes a plurality of frequency values within a prescribed frequency range. This first frequency may, for example, be in the range of 905-925 MHz, a frequency band that is freely available in many parts of the world for short range transmissions.

A passive (i.e., nonpowered) transponder associated with this system receives the first (interrogating) signal as an input and products a second (reply) signal as an output. Passive signal transforming means within the transponder, which converts the first signal to the second signal, includes:

(1) A multiplicity of "signal conditioning elements" coupled to receive the first signal from a transponder antenna. Each signal conditioning element provides an intermediate signal having a known delay and a known amplitude modification to the first signal.

(2) A single "signal combining element" coupled to all of the signal conditioning elements for combining the intermediate signals (e.g., by addition or multiplication) to produce the second signal. This second signal is coupled out to the same or a separate antenna for transmission as a reply.

The signal conditioning elements and the signal combining element impart a known informational code to the second signal which identifies, and is associated with, the particular transponder.

The receiving and decoding apparatus associated with the system includes apparatus for receiving the second signal from the transponder and a mixer, arranged to receive both the first signal and the second signal, for performing four quadrant multiplication of these two signals. The mixer produces, as an output, a third signal containing the difference frequencies (or frequencies derived from the difference frequencies) of the first and second signals, respectively.

Finally, the system disclosed in the aforementioned U.S. patent application Ser. No. 509,523 includes a signal processor, responsive to the third signal produced by the mixer, for detecting the phases and amplitudes of the respective difference frequencies contained in the third signal, thereby to determine the informational code associated with the interrogated transponder.

This particular system has a number of advantages over passive interrogator label systems of the type disclosed in the issued U.S. patents referred to above. For example, this system exhibits substantially improved signal-to-noise performance over the prior known systems. Also, the output of the signal mixer—namely, the third signal which contains the difference frequencies of the first (interrogating) signal and the second (reply) signal—may be transmitted over inexpensive, shielded, twisted-pair wires because these frequencies are in the audio range. Furthermore, since the audio signal is not greatly attenuated when transmitted over long distances, the signal processor may be located at a position quite remote from the signal mixer.

In practice, the transponders used in the passive interrogator label systems of the various types described above comprise surface acoustic wave ("SAW") devices which are susceptible to operational differences from transponder to transponder, depending upon manufacturing variations, and from moment to moment for a given transponder, depending upon variations in ambient temperature. In prior systems, such as those disclosed in the aforementioned patents to Cole et al., Vaughan et al. and Epstein, such variations are insignificant compared to the large "tap" delays inherent in the respective transponders. However, in the system disclosed in the aforementioned patent application Ser. No. 509,523, exceedingly small differences in tap delays are decoded into transponder identification numbers. Indeed, these delays are so small as to be in the order of magnitude of the changes in delay due to the manufacturing and temperature variations.

Variations in transponder response due to manufacturing tolerances are tracable to variations in the metallized pattern deposited on the piezoelectric substrate of the SAW device. Such a pattern includes SAW transducers, SAW reflectors and so-called SAW "delay pads". Variations in the position or interdigital finger line width of transducers and reflectors lead to variations in the time of propagation of a surface acoustic wave from its moment of launch to the moment its acoustic energy is reconverted into electrical energy.

More particularly, there are essentially two sources of manufacuturing variations: (1) variations tracable to the mask which is used in the photolithographic process to deposit the metallization, and (2) variations tracable to the photolithographic manufacturing process itself. Mask to mask variations can be minimized by using new masks only infrequently and by adjusting each new mask to include whatever imperfections existed in the prior mask. Manufacturing process changes can also be reduced, but cannot be eliminated entirely. For example, exposure times through a mask are extremely critical in determining the line widths of interdigital fingers. Furthermore, any lack of orthogonality of the mask during exposure results in differences in pattern dimensions from one side of the substrate to the other. As a result, manufacturing variations will occur during the manufacture of the SAW devices from lot to lot (e.g., about 20 wafers); from wafer to wafer (e.g., about 144 dies); from die to die; and even from one side of a die to the other.

Variations in the transponder response due to changes in temperature result, in part, from the thermal expansion of the substrate material. Although propagation distances are small, an increase in temperature of only 20 degrees Centigrade can produce an increase in propagation time by the period of one entire cycle at a transponder frequency of about 915 MHz.

Although both manufacturing and temperature variations may be ignored if the differences in surface acoustic wave propagation times between the various taps on a SAW device are large, the requirement of such large tap delay time differences leads to inefficient use of substrate real estate. As the size of a SAW device and, thus, the respective tap delay times are reduced, it becomes more and more desirable to find a mechanism for compensating both manufacturing and temperature variations. The need for compensation becomes even more critical when the transponder identification number is encoded by means of small changes in phase of the propagated surface acoustic wave. Such an encoding scheme is proposed in the aforementioned U.S. patent application Ser. No. 509,523.

SUMMARY OF THE INVENTION

It is an object of the present invention, therefore, to provide a means and method for compensating manufacturing variations in a passive interrogator label system.

It is a further object of the present invention to provide a means and method for compensating temperature variations in a passive interrogator label system.

These objects, as well as further objects which will become apparent from the discussion that follows, are achieved, according to the present invention, by measuring the difference in delay times between two successive delay taps in a PILS transponder, and using this difference as a standard for determining the differences in delay times between other successive taps on the same transponder.

As used herein, the term "tap" refers either to the physical point of connection on, or to the instant of time that energy is removed from a "tapped" delay line. In the case of a surface acoustic wave (SAW) device, the term "tap" refers to the mechanism for, or instant of time that acoustic energy in a piezoelectric substrate is reconverted into electrical energy.

More particularly, the invention contemplates that each transponder, which receives the first signal as an input and produces the second signal as an output, includes:

(1) a number of signal delay elements, coupled to receive the aforesaid first signal, each delay element providing an intermediate signal having a nominal, known delay time with respect to the first signal; and (2) a signal combining element, coupled to at least some of the signal delay elements, for combining at least some of the intermediate signals in a known manner to produce the second signal. As described above, the signal delay elements and/or the signal combining element impart a known, unique informational code to the second signal.

In a preferred embodiment of the invention, the nominal, known delay times of some, but not all of the signal delay elements are modified by one of a number of prescribed delay time increments to impart the aforementioned informational code. In this case, the means and method for compensating unknown variations in the nominal, known delay times include the means and step of measuring the actual difference in delay time between at least two chronologically successive signal delay elements which are not modified with the aforesaid prescribed delay time increments.

The invention contemplates also that the signal combining element combines selected ones of the intermediate signals to produce the second signal, the particular selection thereby imparting the aforesaid informational code. For example, the outputs of particular, selected ones of the signal delay elements or "taps" may be superimposed by addition to form the second signal. The presence and absence of intermediate signals from the various signal delay elements thus define the informational code.

In the preferred embodiment of the invention the PILS transponders are realized by SAW devices which comprise a piezoelectric substrate and a layer of metallization on the substrate surface defining a plurality of pathways for the travel of surface acoustic waves. Each SAW pathway thus provides an individual one of the signal delay taps of the transponder.

According to a preferred feature of the present invention, the nominal, known delay times provided in the transponder consist of a common, nominal, known delay $T_0$ for a group of the signal delay means, plus nominal, known differences in delay time ($\Delta T_1, \Delta T_2 \ldots \Delta T_i$) between intermediate signals produced by chronologically successive ones of the signal delay elements in the group. As will be appreciated from the discussion above, both the common delay $T_0$ and the differences in delay time $\Delta T_i$ are subject to variations due to changes in temperature and to variations in the manufacture of the transponder. According to the invention, the common delay time $T_0$, which is substantially longer than the delay time differences $\Delta T_i$, is completely eliminated from the determination of informational codes by utilizing only the differences in delay time $\Delta T_i$ in this determination. In this way, the variations in $T_0$, which tend to be large in absolute terms relative to the time differences $\Delta T_i$, need not be compensated at all.

Rather, according to the invention, the techniques of compensation are applied only to the delay time differences $\Delta T_i$ by measuring the actual difference in delay time between the intermediate signals produced by at least two chronologically successive ones of the signal delay elements and using this difference as a standard for determining the differences in delay times between other successive taps on the same transponder.

More specifically, the transponder is constructed such that $i^{th}$ delay time $t_i = T_0 + K\Delta T + \Delta V_i$, where K is a proportionality constant, $\Delta T$ is the nominal, known difference in delay time between the intermediate signals of two particular successive ones of the signal delay elements in the group, and $\Delta V_i$ is a modification factor due to manufacturing variations. By measuring the quantities $\Delta T$ and $\Delta V_i$, it is possible to determine the expected delay time $t_i - T_0$ for each and every signal delay element from the known quantities K, $\Delta T$ and $\Delta V_i$.

As will be explained in detail hereinbelow, the manufacturing variations $\Delta V_i$ are comprised of a "mask" variation $\Delta M_i$ due to imperfections in the photolithographic mask; an "offset" variation $\Delta O_i$ which arises from the manufacturing process used to deposit the metal layer on the piezoelectric substrate; and a random variation $\Delta R_i$ which is completely unpredictable but usually neglectably small. Specific techniques for determining and compensating both the mask variations $\Delta M_i$ and the offset variations $\Delta O_i$ are described in detail hereinbelow.

For a full understanding of the present invention, reference should now be made to the following detailed description of the preferred embodiments of the invention and to the accompanying drawings.

DESCRIPTION OF THE PREFERRED EMBODIMENTS

Figure 1:
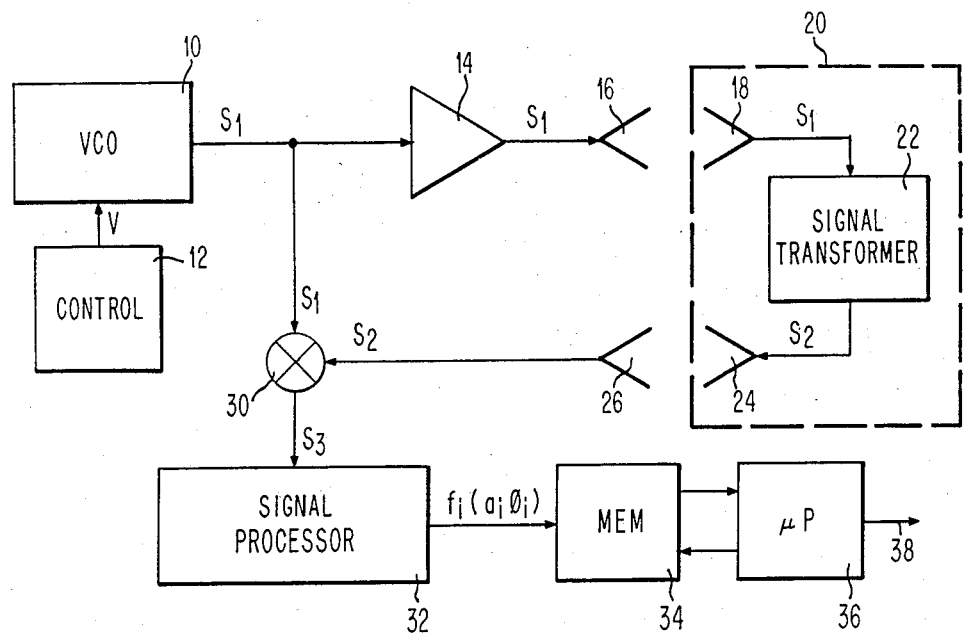
FIG. 1 is a block diagram of a passive interrogator label system of the type disclosed in the aforementioned U.S. patent application Ser. No. 509,523.

The preferred embodiments of the present invention will now be described with reference to FIGS. 1–16 of the drawings. Identical elements in the various figures are designated with the same reference numerals.

FIG. 1 shows the general construction of the passive interrogator label system disclosed in the aforementioned U.S. patent application Ser. No. 509,523. This system comprises a voltage controlled oscillator 10 which produces a first signal S1 at a radio frequency determined by a control voltage V supplied by a control unit 12. This signal S2 is amplified by a power amplifier 14 and applied to an antenna 16 for transmission to a transponder 20.

The signal S1 is received at the antenna 18 of the transponder 20 and passed to a signal transforming element 22. This signal transformer converts the first (interrogation) signal S1 into a second (reply) signal S2. The signal S2 is passed either to the same antenna 18 or to a different antenna 24 for transmission back to the interrogator/receiver apparatus. This second signal S2 carries encoded information which, as a minimum, identifies the particular transponder 20.

The second signal S2 is picked up by a receiving antenna 26. Both this signal S2 and the first signal S1 (or respective signals derived from these two signals) are applied to a mixer (four quadrant multiplier) 30. The signals S1 and S2 are thus mixed or "heterodyned" in the mixer 30 to produce a third signal S3 containing frequncies which include both the sums and the differences of the frequencies contained in the signals S1 and S2. The signal S3 is passed to a signal processor 32 which determines the amplitude $a_i$ and the respective phase $\phi_i$ of each frequncy component $f_i$ among a set of audio-frequency components $(f_0, f_1, f_2 \ldots)$ in the signal S2. Each phase $\phi_i$ is determined with respect to the phase $\phi_0 = 0$ of the lowest frequency component $f_0$.

The information determined by the signal processor 32 is passed to a microcomputer comprising a random access memory 34 and a microprocessor 36. This microcomputer continuously analyzes the frequency, amplitude and phase information and makes decisions based upon this information. For example, the microcomputer may determine the identification number of the interrogated transponder 20. This ID number and/or other decoded information is made available at an output 38.

Figure 2:
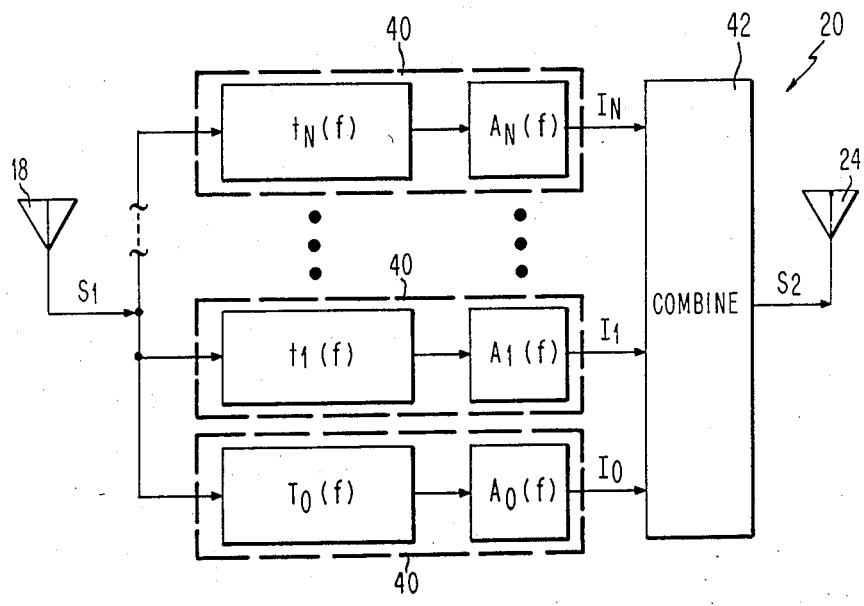
FIG. 2 is a block diagram of a transponder or "label" which is used in the system of FIG. 1.

FIG. 2 illustrates the nature and operation of the transponder 20. This transponder may be an entirely passive device, or it may contain a power source and one or more active elements. As may be seen, the signal transforming element 22, indicated as a block in FIG. 1, comprises a number N+1 of signal conditioning elements 40 and a signal combining element 42. The signal conditioning elements 40 are each connected to the antenna 18 and receive the transmitted interrogation signal S1. Each signal conditioning element 40 produces a respective intermediate signal $I_0, I_1 \ldots I_N$ as an output. These intermediate signals are passed to the combining element 42 which combines them (e.g., by addition, multiplication or the like) to form the reply signal S2.

As may be been in FIG. 2, each signal conditioning element 40 comprises a known delay $T_i$ and a known amplitude modification $A_i$ (either attenuation or amplification). The respective delay $T_i$ and amplitude modification $A_i$ may be functions of the frequency of the received signal S1, or they may provide a constant delay and constant amplitude modification, respectively, independent of frequency. The order of the delay and amplitude modification elements may be reversed; that is, the amplitude modification elements $A_i$ may precede the delay elements $T_i$. Amplitude modification A: can also occur within the path $T_i$.

Figure 3A:
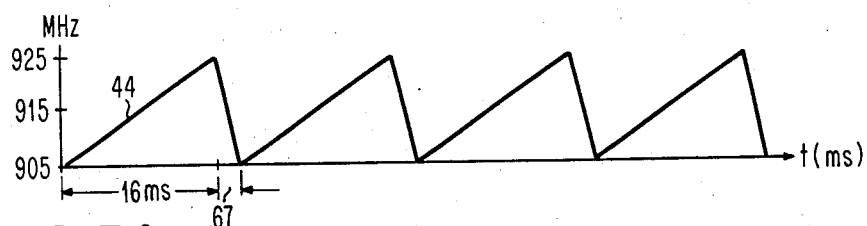
FIGS. 3A and 3B are time diagrams, drawn to different scales, of the radio frequncies contained in the interrogation and reply signals transmitted with the system of FIG. 1.
Figure 3B:
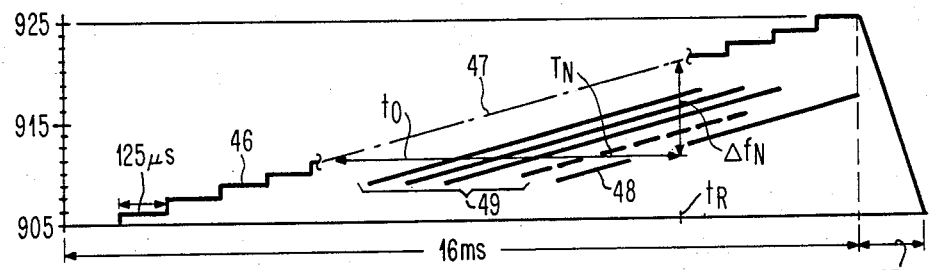

FIGS. 3A and 3B illustrate the frequency of the first signal S1 in the passive interrogator label system shown in FIG. 1. The voltage controlled oscillator 10 is controlled to produce a sinusoidal RF signal with a frequency that is swept in 128 equal steps from 905 MHz to 925 MHz. Each frequency step is maintained for a period of 125 microseconds so that the entire frequency sweep is carried out in 16 milliseconds. Thereafter, the frequency is dropped back to 905 MHz in a relaxation period of 0.67 milliseconds. The stepwise frequency sweep 46 shown in FIG. 3B thus approximates the linear sweep 44 shown in FIG. 3A.

Assuming that the stepwise frequency sweep 44 approximates an average, linear frequency sweep or "chirp" 47, FIG. 3B illustrates how the transponder 20, with its known, discrete time delays $T_0, T_1 \ldots T_N$ produces the second (reply) signal S2 with distinct differences in frequency from the first (interrogation) signal S1. Assuming a round-trip, radiation transmission time of $t_0$, the total round-trip times between the moment of transmission of the first signal and the moments of reply of the second signal will be $t_o+T_0, t_o+T_1, \ldots t_o+T_N$, for the delays $T_o, T_1 \ldots T_N$, respectively. Considering only the transponder delay $T_N$, FIG. 3B demonstrates that, at the same time $t_R$ when the second (reply) signal is received at the antenna 26, the frequency 48 of this second signal will be $\Delta f_N$ less than the instantaneous frequency 47 of the first signal S1 transmitted by the antenna 16. Thus, if the first and second signals are mixed or "heterodyned", this frequency difference $\Delta f_N$ will appear in the third signal as a beat frequency. Understandably, other beat frequencies will also result from the other delayed frequency spectra 49 resulting from the time delays $T_0, T_1 \ldots T_{N-1}$.

In mathematical terms, we assume that the phase of a transmitted interrogation signal is:

$$\phi = 2\pi f \tau$$

where $\tau$ is the round-trip transmission time delay.

For a ramped frequency df/dt or $\dot{f}$, we have:

$$2\pi \dot{f} \tau = d\phi/dt = \omega.$$

$\omega$, which is the beat frequency, is thus determined by $\tau$ for a given ramped frequency or chirp $\dot{f}$.

Figure 4:
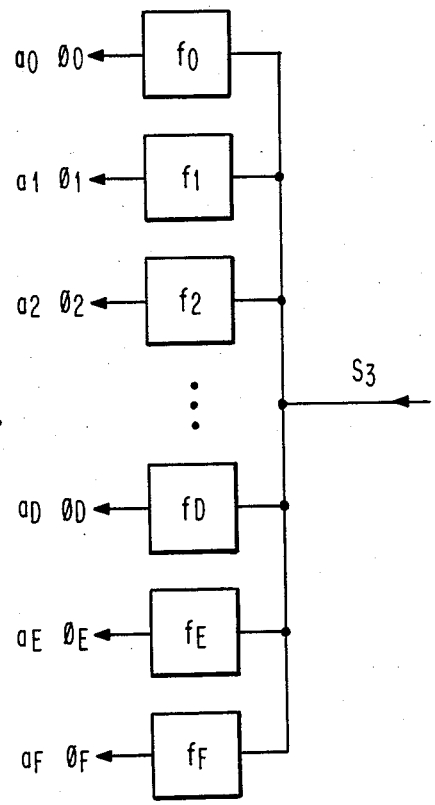
FIG. 4 is a block diagram illustrating the decoding process carried out by the signal processor in the system of FIG. 1.

The function of the signal processor 32 in the system of FIG. 1 is illustrated in FIG. 4. As may be seen, the signal S3 is applied to sixteen bandpass filters, each tuned to a different beat frequency, $f_0, f_1 \ldots f_E, f_F$. The signal processor determines the amplitudes and phases of the signals that pass through these respective filters. These amplitudes and phases contain the code or "signature" of the particular signal transformer 22 of the interrogated transponder 20.

In practice, the amplitudes and phases are determined by a well-known "matched filter" calculation; that is, the in-phase or cosinusoid parts and quadrature phase or sinusoid parts of a known waveform are multiplied, term by term, by those of the incoming waveform to determine the correlation or "degree of match". For each of the sixteen frequencies, the signal processor 32 determines two 16-bit numbers, which are the real and imaginary parts, respectively, of the complex phase and amplitude. The amplitude or power (a) as well as the phase ($\phi_i$) at each respective frequency is then calculated as follows:

$$a_i = [R^2 + I^2]^{\frac{1}{2}} \text{ and}$$

$$\phi_i = \text{arc tan } I/R,$$

where R is the real part and I is the imaginary part of the complex number.

Thereafter, the signal processor 32 stores the amplitude and phase quantities in the RAM 34 for further processing by the microprocessor 36. This microprocessor 36 normalizes the amplitudes and checks to make sure that all amplitudes are within the ripple limit. If one or more of the sixteen amplitudes are above or below the acceptable tolerances, the transponder reading is rejected.

If the amplitudes are within their prescribed limits, the microprocessor 36 determines the differences, modulo 360, of each of the fifteen phases ($\phi_1, \phi_2 \ldots \phi_D, \phi_E, \phi_F$) with respect to the first phase $\phi_0$; i.e., $\phi_{01} = \phi_0 - \phi_1$ mod 360°, $\phi_{02} = \phi_0 - \phi_2$ mod 360°, $\phi_{03} = \phi_0 - \phi_3$ mod 360°, etc. Each of these phase differences is then located in one of the following four phase "bins":

(1) 0°±30°;
(2) 90°±30°;
(3) 180°±30°;
(4) 270°±30°.

If any phase difference (modulo 360°) with respect to $\phi_o$ falls outside of these "bins" (i.e., the ranges given above), then the transponder reading is rejected.

If all the sixteen amplitudes and fifteen phase differences are within their prescribed limits, then the selected "bins" are converted to a transponder identification number which can be as high as $4^{15}$ (assuming that each of the fifteen phase differences can fall into one of four bins). This number is then presented on the microprocessor output line 38.

While the transponder 20 illustrated in FIGS. 1 and 2 can be implemented with a variety of well-known circuits and techniques, in the preferred embodiments of the present invention, the transponders comprise passive surface acoustic wave (SAW) devices to provide the respective delays $T_0, T_1 \ldots T_N$. This type of transponder may be represented in block form in the manner shown in FIG. 5.

Figure 5:
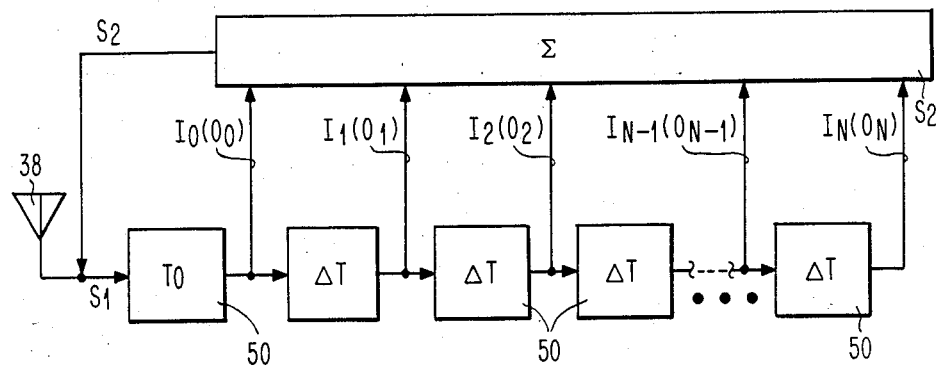
FIG. 5 is a block signal diagram of a passive transponder which may be used with the system of FIG. 1.

The transponder of FIG. 5 receives the signal S1 at its antenna 38 and passes this signal to a series of delay elements 50 having the indicated delay periods $T_0$ and T. After passing each successive delay, a portion of the signal $I_0, I_1, I_2 \ldots I_N$ is tapped off and supplied to a summing element 52. The resulting signal S2, which is the sum of the intermediate signals $I_0 \ldots I_N$, is fed back to the antenna 38 for retransmission to the antenna 26 in the system of FIG. 1.

Figure 6:
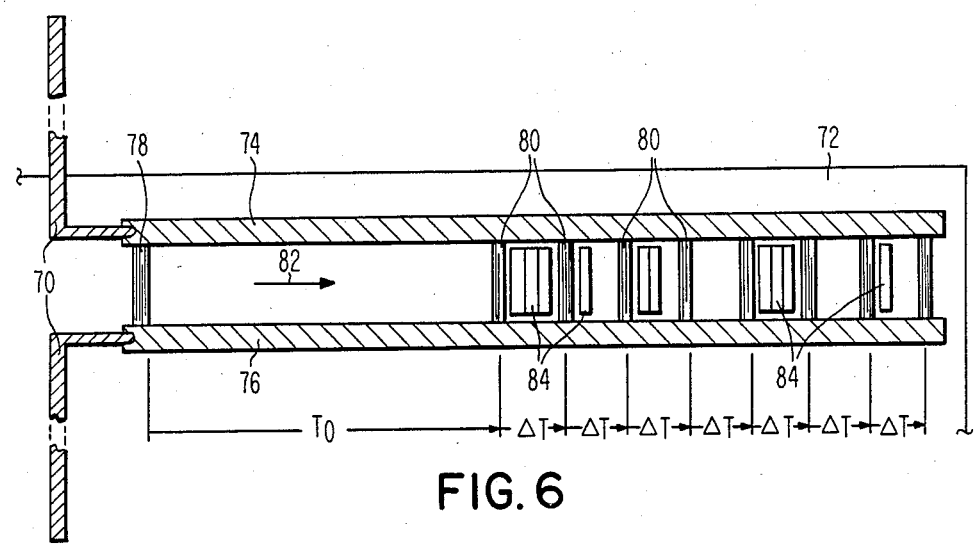
FIG. 6 is a plan view, in enlarged scale, of a first configuration of the transponder of FIG. 5.
Figure 7:
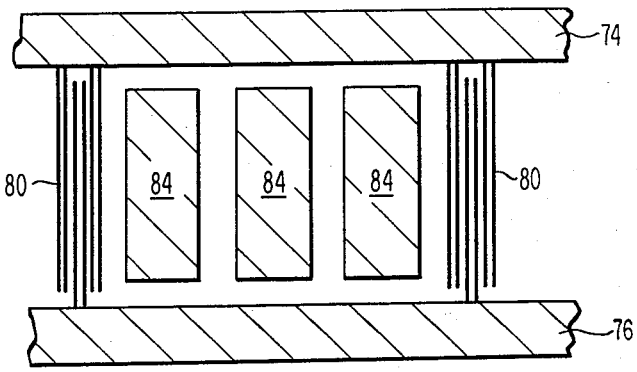
FIG. 7 is a plan view, in greatly enlarged scale, of a portion of the transponder configuration shown in FIG. 6.

FIGS. 6 and 7 illustrate a first configuration of the passive SAW transponder represented in FIG. 5. In this embodiment, a common transmit/receive antenna, formed by a dipole 70, is connected to, and arranged adjacent a SAW device made of a substrate 72 of piezoelectric material such as lithium niobate. On the surface of this substrate is deposited a layer of metal, such as aluminum, forming a metallized structure of the type shown in detail in FIG. 7. This structure consists of two bus bars 74 and 76 connected to the dipole antenna 70, a "launch" transducer 78 and a plurality of "tap" transducers 80. When excited by a signal received from the antenna 70, the launch transducer 78 generates a surface acoustic wave that propagates substantially linearly along the path 82, reaching the tap transducers 80 each in turn. The tap transducers convert the surface acoustic wave back into electrical signals and these are collected, and therefore summed, by the bus bars 74 and 76. The summed electrical signal, in turn, activates the dipole antenna 70 and is converted into electromagnetic radiation for transmission as the second signal S2.

The tap transducers 80 ae provided at equally spaced intervals along the surface acoustic wave path 82, as shown in FIG. 6. An informational code associated with the transponder is imparted by providing a selected number of "delay pads" 84 between the tap transducers. These delay pads, which are shown in detail in FIG. 7, are preferably made of the same material as, and deposited on the substrate together with the bus bars 74, 76 and the transducers 78, 80. Each delay pad has a width sufficient to delay the propagation time of the surface acoustic wave from one tap transducer 80 to the next by the period of one quarter cycle or 90 degrees with respect to an undelayed wave at the frequency of operation (about 915MHz). By providing locations for three delay pads between successive tap transducers, the phase of the surface acoustic wave received by a tap transducer may be controlled to provide four distinct phase possibilities:

(1) no pads between successive tap transducers=0°;
(2) one pad between successive tap transducers=90°;
(3) two pads between successive tap transducers=180°; and
(4) three pads between successive tap transducers=270°.

The phase information, which is contained in the second (reply) signal S2 transmitted by the antenna 70, thus contains the informational code of the transponder.

While the transponder shown in FIGS. 6 and 7 converts a first (interrogation) signal S1 into a second (reply) signal S2 with the respective time delays represented in FIG. 5, other transponder configurations may provide superior performance in implementing this response. FIGS. 8-12 illustrate a number of advantageous configurations of transducers (T) and reflectors (R) on a piezo-electric substrate.

Figure 8:
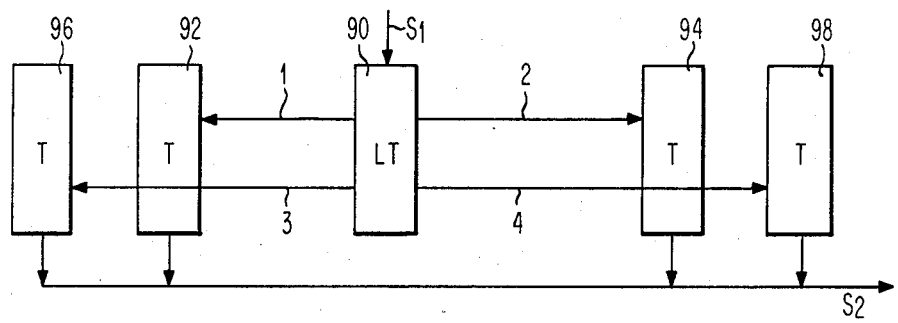
FIG. 8 is a representational diagram, in plan view, of a second configuration of the transponder of FIG. 5.

In FIG. 8, a single launch transducer (LT) 90 transmits surface acoustic waves in both directions to tap transducers (T) 92, 94, 96 and 98. As may be seen, the launch transducer 90 is slightly offset (to the left as illustrated in FIG. 8) so that the length of the transmission path 1 to the tap transducer 92 is shorter than the path 2 to the tap transducer 94. Similarly, the path 3 to the tap transducer 96 is shorter than the path 4 to the tap transducer 98. In particular, the various transducers are positioned such that the differences in propagation times between the pathways 1 and 2, 2 and 3, and 3 and 4 are all equal ($\Delta T$). The outputs of the tap transducers 92, 94, 96 and 98 may thus be summed to produce a second signal S2 of the type represented in FIG. 5.

Figure 9:
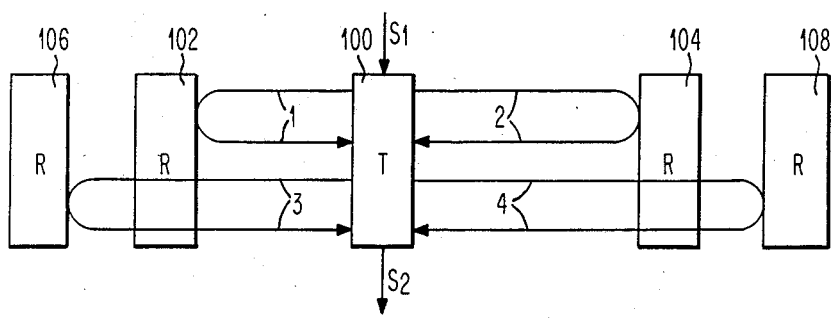
FIG. 9 is a representational diagram, in plan view, of a third configuration of the transponder of FIG. 5.

FIG. 9 illustrates the same basic configuration as in FIG. 8 except that the launch transducer 100 operates also to reconvert the SAW energy into electrical energy to form the signal S2. Reflectors 102, 104, 106 and 108 serve to reflect the acoustic wave energy proceeding on paths 1, 2, 3 and 4, respectively, back toward the transducer 100. As in the configuration of FIG. 8, the differences in propagation times between successive pathways (i.e., between pathways 1 and 2, 2 and 3, and 3 and 4) are all equal ($\Delta T$).

In the embodiments of FIG. 8 and FIG. 9, surface acoustic waves travelling along pathways 3 and 4 must pass beneath transducers 92, 94 (FIG. 8) or reflectors 102, 104 (FIG. 9). Such an arrangement of successive, multiple tap transducers or reflectors in a pathway introduces unwanted reflections and spurious signals into the output signal S2, making subsequent signal processing more difficult.

Figure 10:
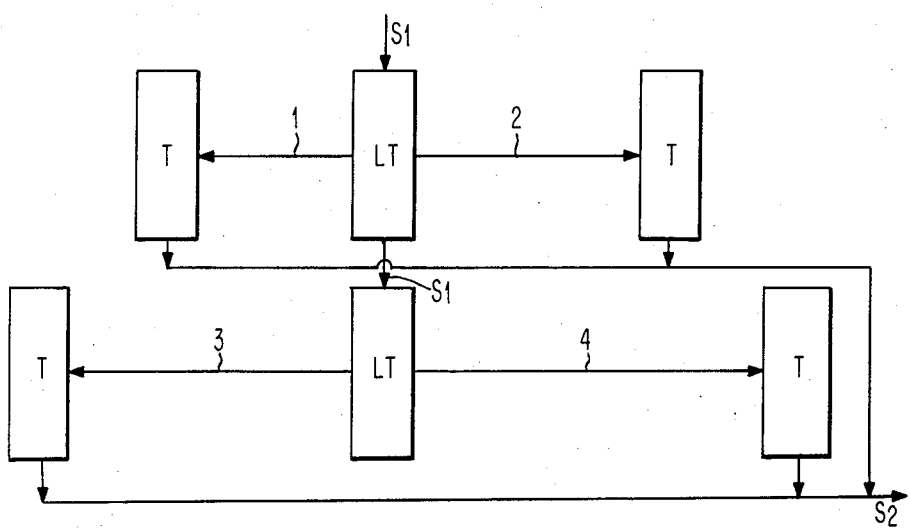
FIG. 10 is a representational diagram, in plan view, of a fourth configuration of the transponder of FIG. 5.
Figure 11:
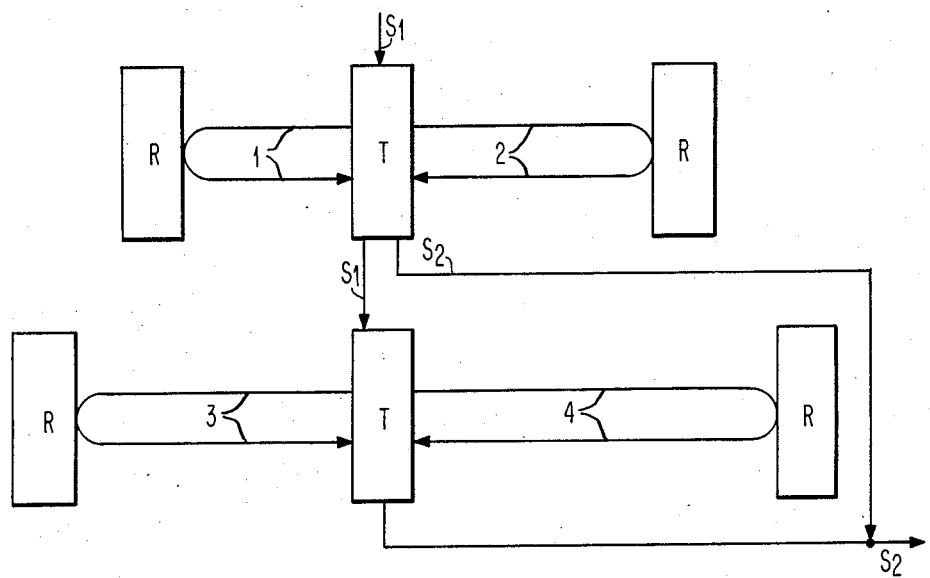
FIG. 11 is a representational diagram, in plan view, of a fifth configuration of the transponder of FIG. 5.

FIGS. 10 and 11 illustrate SAW device configurations, corresponding to FIGS. 8 and 9, respectively, in which plural launch transducers simultaneously receive and convert the signal S1 into SAW energy. With this arrangement the pathways 1, 2, 3 and 4 are spacially separated so that the surface acoustic waves can travel on the surface of the substrate without passing beneath a reflector or transducer.

Figure 12:
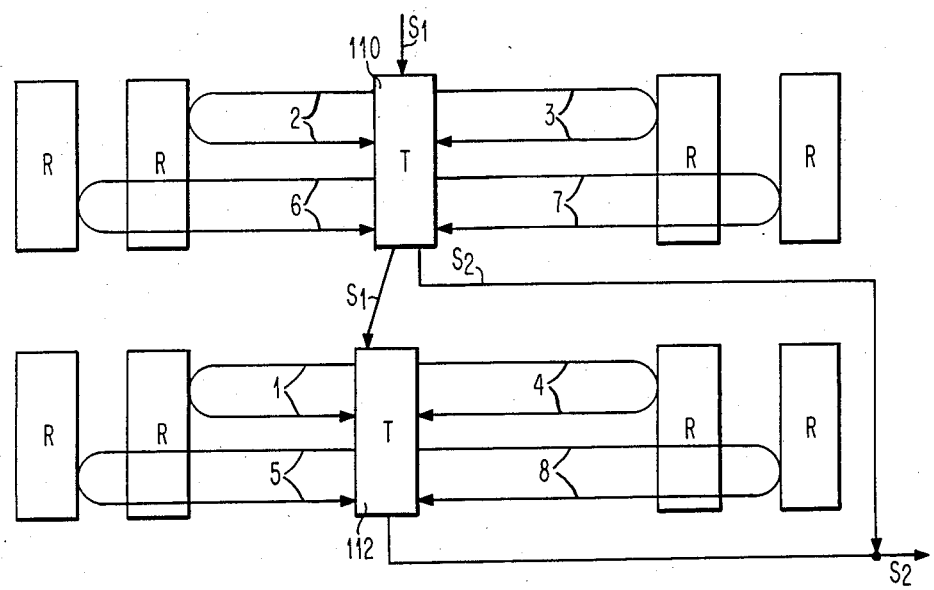
FIG. 12 is a representational diagram, in plan view, of a sixth configuration of the transponder of FIG. 5.

It is, of course, possible to combine the configurations of FIGS. 8-11 in various ways. FIG. 12 shows an embodiment which combines the principles illustrated in FIGS. 9 and 11. In this embodiment, two launch-/receive transducers 110 and 112 simultaneously convert the interrogation signal S1 into surface acoustic waves which travel along pathways 1, 2, 3, 4, 5, 6, 7 and 8. The transducers 110 and 112 are positioned so that the propagation times along these pathways are staggered, from one pathway to the next, by a fixed amount $\Delta T$; that is, the propagation time along pathway 2 is $\Delta T$ longer than along pathway 1, the propagation time along pathway 3 is $\Delta T$ longer than along pathway 2, etc.

It will be appreciated that an information code can be imparted to the second (reply) signal S2 by means of "delay pads" of the type illustrated in FIGS. 6 and 7. These delay pads may be inserted at appropriate places along the respective propagation pathways illustrated in FIGS. 8-12.

Figure 13:
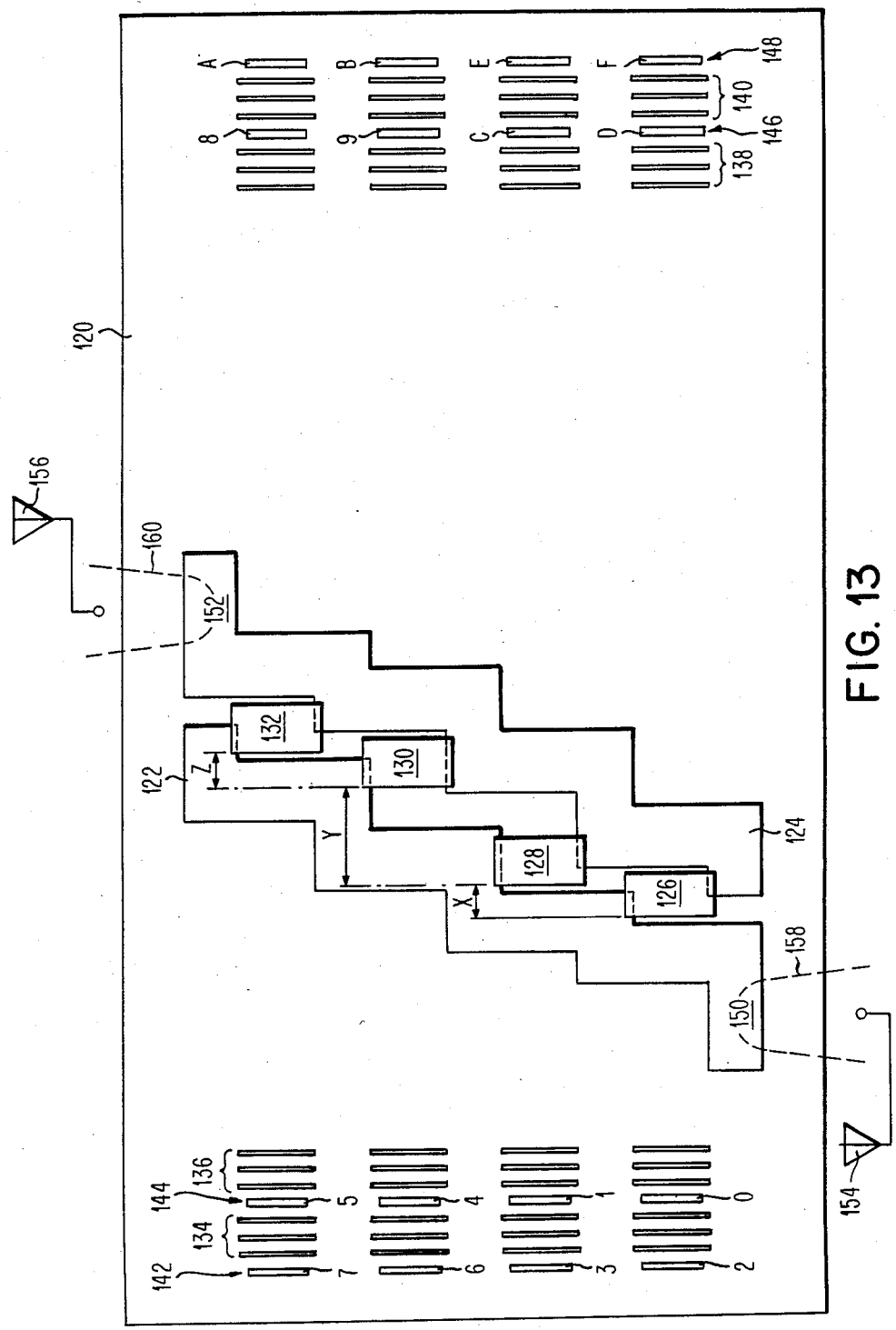
FIG. 13 is a plan view, in enlarged scale, of a seventh configuration of the transponder of FIG. 5.
Figure 14:
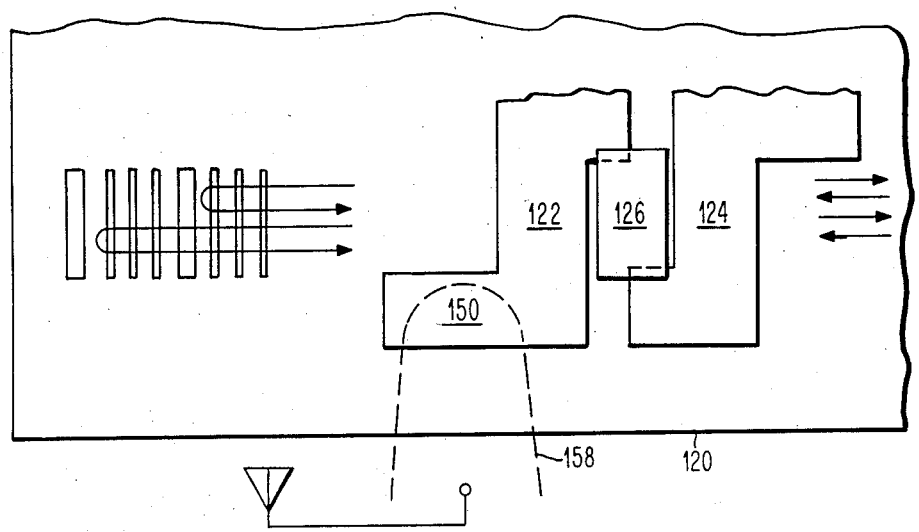
FIG. 14 is a plan view, in greatly enlarged scale, of a portion of the transponder configuration shown in FIG. 13.

FIG. 13 shows the specific, preferred embodiment of a passive transponder which may be employed in the system according to the present invention. The embodiment of FIG. 13 comprises a substrate 120 of piezoelectric material, such as lithium niobate, on which is deposited a pattern of metallization essentially as shown. The metallization includes two bus bars 122 and 124 for the transmission of electrical energy to four launch transducers 126, 128, 130 and 132. These launch transducers are staggered, with respect to each other, with their leading edges separated by distances X, Y and Z, respectively, as shown. The distances X and Z are identical; however, the distance Y is larger than X and Z for reasons which will become clear below. Further metallization includes four parallel rows of delay pads 134, 136, 138 and 140 and four parallel rows of reflectors 142, 144, 146 and 148. The two rows of reflectors 144 and 146 which are closest to the transducers are called the "front rows" whereas the more distant rows 142 and 148 are called the "back rows".

The bus bars 122 and 124 include contact pads 150 and 152, respectively, to which are connected the associated poles 154 and 156 of a dipole antenna. These two poles are connected to the contact pads by contact elements or wires 158 and 160, represented in dashed lines.

The embodiment of FIG. 13 is similar, in principle, to the embodiment of FIG. 12. The provision of four transducers 126, 128, 130 and 132 and two rows of reflectors 142, 144, 146, and 148 on each side of the transducers results in a total of sixteen SAW pathways of different lengths and, therefore, sixteen "taps". These sixteen pathways (taps) are numbered 0, 1, 2 . . . D, E, F, as indicated by the reference number (letter) associated with the individual reflectors. Thus, pathway 0 extends from transducer 126 to reflector 0 and back again to transducer 126. Pathway 1 extends from transducer 128 to reflector 1 and back again to transducer 128. The spacial difference in length between pathway 0 and pathway 1 is twice the distance X (the offset distance between transducers 126 and 128). This results in a temporal difference of $\Delta T$ in the propagation time of surface acoustic waves.

Similarly, pathway 2 extends from transducer 126 to reflector 2 and back again to transducer 126. Pathway 3 extends from transducer 128 to reflector 3 and back to transducer 128. The distance X is chosen such that the temporal differences in the length of the pathway 2 with respect to that of pathway 1, and the length of the pathway 3 with respect to that of pathway 2 are also both equal to $\Delta T$.

The remaining pathways 4, 5, 6, 7 . . . E, D, F are defined by the distances from the respective transducers launching the surface acoustic waves to the associated reflectors and back again. The distance Y is equal to substantially three times the distance X so that the differences in propagation times between pathway 3 and pathway 4 on one side of the device, and pathway B and pathway C on the opposite side are both equal to $\Delta T$. With one exception, all of the temporal differences, from one pathway to the next successive pathway are equal to the same $\Delta T$. The SAW device is dimensioned so that $\Delta T$ nominally equals 100 nanoseconds.

In order to avoid the possibility that multiple back and forth propagations along a shorter pathway (one of the pathways on the left side of the SAW device as seen in FIG. 13) appear as a single back and forth propagation along a longer pathway (on the right side of the device), the difference in propagation times along pathways 7 and 8 is made nominally equal to 150 nanoseconds. Specifically, the nominal periods of propagation (tap delays) along each of the sixteen pathways, and the third signal (mixer) difference frequency resulting from each of these tap delays, are as follows:

TABLE

| Pathway (Tap) | Tap Delay NS | Corresponding Audio Frequency Hz |
| --- | --- | --- |
| 0 | 900 | 1000 |
| 1 | 1000 | 1281 |
| 2 | 1100 | 1407 |
| 3 | 1200 | 1533 |

TABLE-continued

| Pathway (Tap) | Tap Delay NS | Corresponding Audio Frequency Hz |
| --- | --- | --- |
| 4 | 1300 | 1659 |
| 5 | 1400 | 1785 |
| 6 | 1500 | 1911 |
| 7 | 1600 | 2037 |
| 8 | 1750 | 2232 |
| 9 | 1850 | 2358 |
| A | 1950 | 2484 |
| B | 2050 | 2610 |
| C | 2150 | 2736 |
| D | 2250 | 2862 |
| E | 2350 | 2988 |
| F | 2450 | 3114 |

Figure 15:
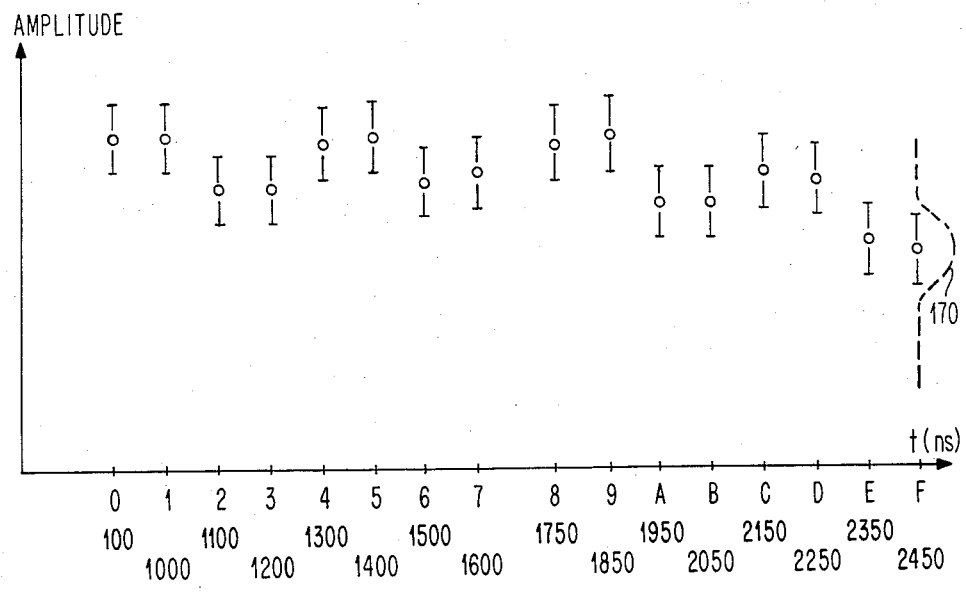
FIG. 15 is a diagram showing the respective time delays of the different SAW pathways in the transponder of FIG. 13.

FIG. 15 is a graph illustrating the ranges of amplitudes which are expected in the individual components of the second (reply) signal associated with the respective pathways or tap delays 0–F. As may be seen, the greatest signal amplitudes will be received from pathways having reflectors in their front rows; namely, pathways 0, 1, 4, 5, 8, 9, C and D. The signals received from the pathways having reflectors in their back rows are somewhat attenuated due to reflections and interference by the front row reflectors. If any one of the amplitudes $a_i$ at one of the sixteen frequencies $f_i$ in the third signal falls outside its prescribed range, the decoded identification number for that transponder is rejected.

As indicated above, transponders of the type illustrated in FIGS. 6–13 are susceptible to so-called "manufacturing" variations in response, due to manufacturing differences from transponder to transponder, as well as temperature variations in response due to variations in ambient temperature. Particularly the case where small differences in tap delays in the order of one SAW cycle period are measured to determine the encoded transponder identification number, these manufacturing and/or temperature variations can be in the order of magnitude of the informational signal. It is desirable, therefore, to provide systems for compensating both manufacturing and temperature variations. Such systems will now be described in connection with the embodiment of FIGS. 1 and 13.

As explained above, the transponder identification number contained in the second (reply) signal is determined by the presence or absence of delay pads in the respective SAW pathways. These delay pads make a slight adjustment to the propagation time in each pathway, thereby determining the phase of the surface acoustic wave at the instant of its reconversion into electrical energy at the end of its pathway. According to the invention, a fixed code (phase) is imparted to at least two pathways in the SAW device, and the propagation times for these pathways are used as a standard for the propagation times of all other pathways.

In particular, in the embodiment of FIG. 13, all three delay pads are provided in each of the pathways 0, 1, D and F, thereby establishing the fixed code. The delay pads in all the remaining pathways are chosen to provide one of four phases with the exception of pathway 9. In pathway 9, only one of two phases (0 degrees and 180 degrees) is selected by providing either all three delay pads or only one.

Assuming now that the propagation delay time along pathway 0 is $T_0$, then, by definition, the propagation time or tap delay $t_1$ along the pathway 1 will be:

$t_1 = T_0 + \Delta T.$

The parameters $T_0$ and $\Delta T$ vary in accordance with changes in the ambient temperature.

The propagation time or tap delay for pathway 2 is:

$t_2 = T_0 + 2\Delta T - \Delta\phi_2 + \Delta M_2 + \Delta O_2 + \Delta R_2,$ where $\Delta\phi_2$ is the change in propagation time due to the encoded phase (absence of one or more of the three delay pads); $\Delta M_2$ is a time variation traceable to the mask; $\Delta O_2$ is the time variation traceable to the manufacturing process; and $\Delta R_2$ is the time variation due to random defects in the substrate crystal structure and/or the metallization layer in pathway 2.

The mask variation $\Delta M_i$ for a given pathway i—i.e., a variation in tap delay due to imperfections in the mask—will be the same for all transponders made from the same mask.

The time variations $\Delta O_i$ is the so-called "offset" variation which is primarily due to variations in the interdigital finger line widths of a reflector in the front row through which the surface acoustic waves must pass to reach a reflector i in the back row. Variations in transducer finger line widths are already reflected in the initial pathway propagation time $T_0$.

Since the time variations $\Delta R_i$ are completely random from pathway to pathway and from transponder to transponder, it is not possible to compensate for these. If a random variation $\Delta R_i$ becomes too large, however, the transponder identification number reading will be rejected, since one of the amplitudes $a_i$ or phases $\phi_i$ will fall outside of the acceptable limits.

Continuing with the formulae for propagation times, the tap delay for the third pathway is:

$t_3 = T_0 + 3\Delta T - \Delta\phi_3 + \Delta M_3 + \Delta O_3 + \Delta R_3.$

As in the case of pathway 2, the ambient temperature will affect both $T_0$ and $\Delta T$. Offset variations $\Delta O_3$ are present since the surface acoustic waves in pathway 3 must pass beneath a front row reflector.

For pathway 4, however, the tap delay is:

$t_4 = T_0 + 4\Delta T - \Delta\phi_4 + \Delta M_4 + \Delta R_4.$

The term $\Delta O_i$ for an offset variation is not included in this formula because the surface acoustic wave does not pass beneath a reflector in pathway 4. Offset variations due to other variations in the metallization, such as variations in the widths of the delay pads, are small compared to effect of a reflector and are consequently ignored.

Similarly, the tap delays for pathways 5-A are:

$t_5 = T_0 + 5\Delta T - \Delta\phi_5 + \Delta M_5 + \Delta R_5$ $t_6 = T_0 + 6\Delta T - \Delta\phi_6 + \Delta O_6 + \Delta M_5 + \Delta R_5$ $t_7 = T_0 + 7\Delta T - \Delta\phi_7 + \Delta O_7 + \Delta M_6 + \Delta R_6$ $t_8 = T_0 + 8\tfrac{1}{2}\Delta T - \Delta\phi_8 + \Delta M_8 + \Delta R_8$ $t_9 = T_0 + 9\tfrac{1}{2}\Delta T - \Delta\phi_9 + \Delta M_9 + \Delta R_9$ $t_A = T_0 + 10\tfrac{1}{2}\Delta T - \Delta\phi_A + \Delta O_A + \Delta M_A + \Delta R_A$ The remaining tap delays $t_B$, $t_C$, $t_D$, $t_E$ and $t_F$ contain terms which follow this same pattern.

It may be seen, from the exercise above, that there are primarily three types of variations which must be compensated:

(1) Variations due to temperature which are reflected in large changes in the propagation times $T_0$ and $\Delta T$. These temperature variations are substantially (but not exactly) the same for each pathway.

(2) Mask variations $\Delta M$ which are different for each pathway but the same for all transponders manufactured from a given mask.

(3) Offset variations $\Delta O$ which are primarily due to the effect of variations in the line widths of front row reflectors on the pathways to back row reflectors. These variations are tracable to the manufacturing process (such as the mask exposure time) and are normally the same for all parallel front row reflectors on one side of a transponder substrate. The line widths may vary from one side of the substrate to the other due to lack of orthogonality in the mask exposure.

In the preferred embodiment of the present invention, the three types of variations identified above—namely, temperature, mask and offset variations—are compensated as follows:

(1) Temperature variations are compensated by determining the times $T_0$ and $\Delta T$ from two successive pathways i and j to provide a first temperature estimate, and then compensating small, second order variations by averaging the propagation times of the four front row pathway pairs (pathways 0 and 1, 4 and 5, 8 and 9 and C and D). In particular, defining the phase difference $\phi_i - \phi_j$ as $\phi_{ij}$, we have as a first order of magnitude:

$T_1 = \phi_{10} = \Delta T.$

This measurement, which provides a "standard" for all further measurements, is uneffected by differences in phase because both $\phi_0$ and $\phi_1$ have a fixed phase (in this embodiment, all three delay pads are present).

Using the formula for $T_1$, we determine the average for the four front row pathway pairs (all $\Delta T$ apart):

$T_2 = [(\phi_{54} - T_1) \bmod 90 + (\phi_{98} - T_1) \bmod 90 + (\phi_{DC} - T_1) \bmod 90]/4$ We look at modulo 90 of each term to eliminate the effects of the encoded information (presence or absence of pads).

Next we determine the difference between propagation times over pathways 9 and D and take the average:

$T_3 = \{[\phi_{D9} - 4(T_1 + T_2)] \bmod 180\}/4$

We look at modulo 180 in this case because pathway 9 is restricted to two phases (0° and 180°) and pathway D is restricted to one phase (0°).

Finally we do the same for pathways 0 and 4 to determine the average time difference between these taps:

$T_4 = \{[\phi_{40} 31\ 4(T_1 + T_2 + T_3)] \bmod 90\}/4$

The best temperature estimate is therefore:

$\phi_{10} = \Delta T = T_1 + T_2 + T_3 + T_4$

This formula is used in the determination of the respective tap delays $t_1$, $t_2$, etc.

(2) The variation $\Delta M$, which relates to the mask, will be the same for all transponders made from the same mask. Consequently, this variation may be isolated and compensated for by determining the amplitudes $a_i$ and phases $\phi_i$ for a large number of transponders, and thereafter determining statistically the acceptable limits for these parameters. By way of illustration, the amplitudes $a_i$ from different transponders made from the same mask for each frequency $f_i$ may be plotted on a graph such as that shown in FIG. 15 to determine their statistical distribution. The acceptable limits of amplitude may then be determined for each frequency from this statistical distribution. FIG. 15 shows one such distribution curve 170 of amplitudes for the frequency 2.45 KHz (pathway F).

Variations in the phases $\phi_i$ of different transponders tracable to the mask are compensated in a similar manner by adjusting the center phases (nominally 0°, 90°, 180° and 270°) and the phase tolerances (nominally ±30° about each center phase) for each "phase bin".

After the initial compensation for mask variations $\Delta M$, all subsequent masks used to manufacture transponders may be adjusted so as to match the imperfections in the original mask. The mask variations $\Delta M$ are therefore caused to remain identical for all transponders used in a given system.

(3) Finally, offset variations $\Delta O$, which are tracable to manufacturing process variations, are compensated by determining $\Delta O_F$ and using this value as a standard to eliminate the effect of offset in all the "back row" pathways; i.e., pathways 2, 3, 6, 7, A, B and E.

In particular, from the formula for $t_F$, $$\Delta O_F = t_F - T_0 - 15\tfrac{1}{2}\Delta T,$$

where $\Delta T$ has been determined from the temperature compensation calculation described above and $\Delta \phi_F = 0$ (no encoded phase). This formula provides only a first approximation of $\Delta \phi_i$, since it ignores the effects of terms $\Delta M_F$ and $\Delta R_F$. In order to provide a more accurate figure for $\Delta O$, we use this initial value as a first approximation to decode the phases of all the other back row taps (pathways 2, 3, 6, 7, A, B and E). Thereafter, taking the respective phase differences between the back row and front row taps, we have:

$$\phi_{off21} = [(\phi_{20} - \phi_{FD}) \bmod 90 + (\phi_{31} - \phi_{FD}) \bmod 90 + (\phi_{64} - \phi_{FD}) \bmod 90 + (\phi_{75} - \phi_{FD}) \bmod 90]/4$$

$$\phi_{off22} = [(\phi_{AB} - \phi_{FD}) \bmod 90 + (\phi_{B9} - \phi_{FD}) \bmod 90 + (\phi_{EC} - \phi_{FD}) \bmod 90 + (\phi_{FD} - \phi_{FD}) \bmod 90]/4$$

where $\phi_{off21}$ is the average offset on the left side of the substrate (as seen in FIG. 13) and $\phi_{off22}$ is the average offset on the right side of the substrate. These offsets are separately calculated since they may be different due to lack of orthogonality in the mask exposure process.

Finally, the phases for pathways 2, 3, 6 and 7 are compensated by subtracting $\phi_{off1}$ and the phases for pathways A, B and E are compensated by subtracting $\phi_{off2}$, where:

$$\phi_{off1} = \phi_{FD} + \phi_{off21} - 2\Delta T, \text{ and}$$

$$\phi_{off2} = \phi_{FD} + \phi_{off22} - 2\Delta T.$$

Figure 16:
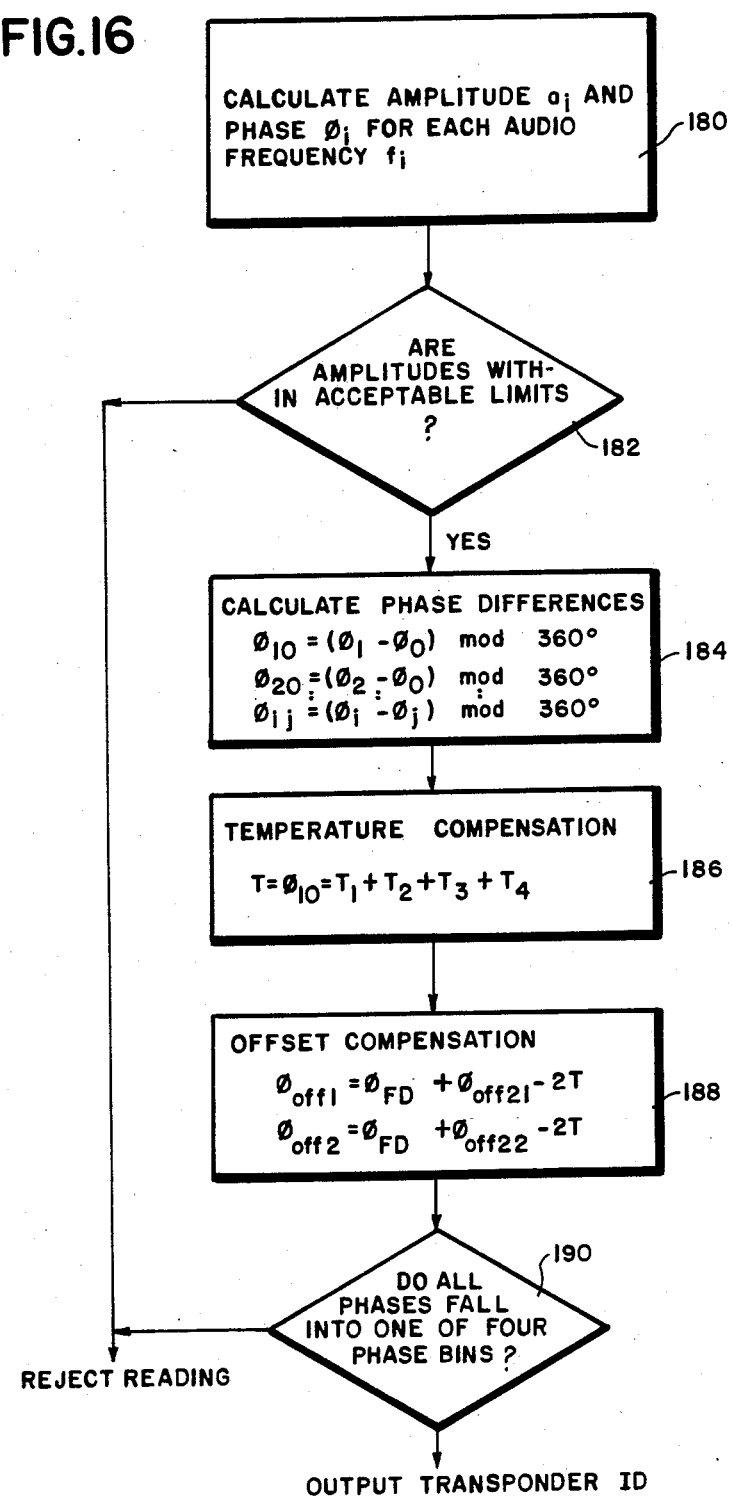
FIG. 16 is a flow diagram showing the order of calculations carried out by the signal processor and microprocessor in the system of FIG. 1.

The entire process of compensation is illustrated in the flow chart of FIG. 16. As is indicated there, the first step is to calculate the amplitude $a_i$ and phase $\phi_i$ for each audio frequency $f_i$ (block 180). Thereafter, the sixteen amplitudes are compared against their acceptable limits (block 182). As shown in FIG. 15, these limits may be different for each amplitude. If one or more amplitudes fall outside the acceptable limits, the transponder reading is immediately rejected.

If the amplitudes are acceptable, the phase differences $\phi_{ij}$ are calculated (block 184) and the temperature compensation calculation is performed to determine the best value for $\Delta T$ (block 186). Thereafter, the offset compensation calculation is performed (block 188) and the phases for the pathways 2, 3, 6, 7, A, B and E are adjusted.

Finally, an attempt is made to place each of the preencoded phases into one of the four phase bins (block 190). If all such phases fall within a bin, the transponder identification number is determined; if not, the transponder reading is rejected.

There has thus been shown and described a novel passive interrogator label system having offset compensation and temperature compensation which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a system for interrogating a plurality of transponders, each carrying encoded information, said system comprising:
   (a) at least one transponder for receiving a first signal and transmitting second signal in reply thereto, said transponder comprising signal transforming means, coupled to receive said first signal as an input, for producing said second signal as an output, said signal transforming means including:
      (1) a plurality of signal delay means coupled to receive said first signal, each signal delay means providing an intermediate signal having a nominal, known delay time with respect to said first signal, different signal delay means providing different delay times which increase successively from shortest to longest; and
      (2) signal combining means, coupled to at least some of said signal delay means, for combining at least some of said intermediate signals in a known manner to produce said second signal, said signal delay means and/or said signal combining means imparting a known informational code to said second signal associated with said transponder;
   (b) interrogator/receiver means for transmitting said first signal to, and receiving said second signal from said at least one transponder; and
   (c) signal decoding and processing means, coupled to said interrogator/receiver means, for determining said informational code associated with each transponder;
   the improvement wherein said signal decoding and processing means includes means for compensating unknown variations in said nominal, known delay time of each signal delay means, said compensating means including:

(1) means for measuring the actual difference in delay time between at least two successively longer delay times of respective signal delay means; and (2) means for determining said nominal, known delay times of the other signal delay means, using said actual delay time difference as a standard.

2. The system defined in claim 1, wherein said nominal, known delay times of some, but not all of said signal delay means are modified by one of a plurality of prescribed delay time increments to impart said informational code, and wherein means (1) includes means for measuring the actual difference in delay time of at least two successively longer delay times which are not modified with said prescribed delay time increments.

3. The system defined in claim 1, wherein said signal combining means combines selected ones of said intermediate signals to produce said second signal, the combination of said selected intermediate signals thereby imparting said signal informational code.

4. The system defined in claim 1, wherein said signal combining means combines said intermediate signals by addition, thereby forming said second signal by superposition of said intermediate signals.

5. The system defined in claim 1, wherein said transponder comprises a piezoelectric substrate and a layer of metallization defining a plurality of pathways for the travel of surface acoustic waves, each SAW pathway providing an individual one of said signal delay means.

6. The system defined in claim 1, wherein said nominal, known delay times consist of a common, nominal known delay $T_0$ for a group of said signal delay means, plus nominal, known differences in delay time ($\Delta T_1$, $\Delta T_2 \ldots \Delta T_i \ldots$) between successively longer delay times of respective signal delay means in said group, said differences in delay time ($\Delta T_i$) being subject to variations due to changes in temperature and to variations in the manufacture of said transponder, and wherein means (1) includes means for measuring the actual difference in delay time ($\Delta T_i$) between the intermediate signals produced by at least two successively longer delay times of said respective signal delay means.

7. The system defined in claim 6, wherein the $i^{th}$ delay time $t_i$ equals $T_o + K\Delta T + \Delta V_i$, where K is a proportionality constant, $\Delta T$ is a nominal, known difference in delay time between the intermediate signals of two particular successive ones of said signal delay means in said group, and $\Delta V_i$ is a modification factor for the $i^{th}$ delay time due to manufacturing variations, wherein means (1) includes means for measuring $\Delta T$ and wherein means (2) includes means for determining the expected delay time $t_i - T_o$ for each signal delay means from the known quantities K and $\Delta T$.

8. The system defined in claim 7, wherein $\Delta V_i$ includes a mask variation $\Delta M_i$ due to imperfections in the photolithographic mask; an offset variation $\Delta \phi_i$ due to the photolithographic manufacturing process and a random variation $\Delta R_i$; wherein said mask variation $\Delta M_i$ is determined by measuring the statistical distribution of the modification factors $\Delta V_i$ for a plurality of transponders; and wherein means (2) includes means for determining the expected delay time $t_i - T_o$ for each signal delay means from the known quantities K, $\Delta T$ and $\Delta M_i$.

9. The system defined in claim 8, wherein said offset variation $\Delta \phi_i$ is determined by measuring said actual difference in delay time ($\Delta T_i$) between the intermediate signals produced by two successively longer delay times of said respective signal delay means and substracting therefrom the difference between two successive expected delay times $t_i - t_{i-1}$.

* * * * *